United States Patent [19]
Martin et al.

[11] Patent Number: 5,935,492
[45] Date of Patent: Aug. 10, 1999

[54] METHOD AND APPARATUS FOR DEMOLDING OPHTHALMIC CONTACT LENSES

[75] Inventors: Wallace Anthony Martin, Orange Park, Fla.; Ture Kindt-Larsen, Holte, Denmark; Craig William Walker, Jacksonville, Fla.

[73] Assignee: Johnson & Johnson Vision Products, Inc., Jacksonville, Fla.

[21] Appl. No.: 08/979,663

[22] Filed: Nov. 26, 1997

Related U.S. Application Data

[63] Continuation of application No. 08/629,454, Apr. 10, 1996, abandoned, which is a continuation of application No. 08/257,871, Jun. 10, 1994, abandoned.

[51] Int. Cl.$^6$ ..................................................... B29D 11/00
[52] U.S. Cl. ..................... 264/1.37; 264/334; 425/174.4; 425/436 R; 425/808
[58] Field of Search .................................. 264/1.36, 1.37, 264/1.38, 1.1, 334; 425/808, 174, 174.4, 440, 436 R

[56] References Cited

U.S. PATENT DOCUMENTS

| | | | |
|---|---|---|---|
| 4,495,313 | 1/1985 | Larsen | 523/106 |
| 4,565,348 | 1/1986 | Larsen | 249/122 |
| 4,640,489 | 2/1987 | Larsen | 249/122 |
| 4,889,664 | 12/1989 | Kindt-Larsen et al. | 264/2.6 |
| 5,039,459 | 8/1991 | Kindt-Larsen et al. | 264/2.6 |
| 5,080,839 | 1/1992 | Kindt-Larsen | 264/2.6 |
| 5,094,609 | 3/1992 | Kindt-Larsen | 425/445 |
| 5,294,379 | 3/1994 | Ross et al. | 264/1.36 |
| 5,326,505 | 7/1994 | Adams et al. | 264/1.36 |
| 5,417,557 | 5/1995 | Ross et al. | 425/808 |

FOREIGN PATENT DOCUMENTS

| | | | |
|---|---|---|---|
| 528664 | 2/1993 | European Pat. Off. | 264/1.1 |
| 60-192606 | 10/1985 | Japan | 264/334 |
| 61-78613 | 4/1986 | Japan | 264/334 |
| 61-283509 | 12/1986 | Japan . | |
| 4-59314 | 2/1992 | Japan | 264/334 |

*Primary Examiner*—Mathieu D. Vargot

[57] ABSTRACT

Methods and apparatus which are utilized for the production of ophthalmic lenses, and more particularly, a method for the removal or demolding of molded ophthalmic contact lenses from the individual molds in which they are produced. The apparatus implements the demolding of such ophthalmic lenses, the latter of which may consist of suitable hydrogel contact lenses or other types of high-precision ophthalmic lenses; for example, such as intraocular contact lenses. Mechanical prying apart of such mating mold half portions, and to facilitate this procedure at a reduced application of force, while concurrently potentially preventing or at least appreciably ameliorating the extent of any possible sticking together of the mold half portions is effected in that mechanical leverage applied to the upper mold half portion, in addition to the application of the heating action thereto.

30 Claims, 7 Drawing Sheets

METHOD AND APPARATUS FOR DEMOLDING OPHTHALMIC CONTACT LENSES

This is a continuation of application Ser. No. 08/629,454 filed on Apr. 10, 1996, now abandoned, which is a continuation of application Ser. No. 08/257,871, filed on Jun. 10, 1994, also now abandoned.

BACKGROUND OF THE INVENTION

1. Field of the Invention

The present invention relates generally to methods and apparatuses which are utilized for the production of ophthalmic lenses, and more particularly, pertains to a method for the removal or demolding of molded ophthalmic contact lenses from the individual molds in which they are produced. Moreover, the invention is also directed to the provision of novel apparatus for implementing the demolding of such ophthalmic lenses, the latter of which may consist of suitable hydrogel contact lenses or other types of high-precision ophthalmic lenses; for example, such as intraocular contact lenses, and wherein the apparatus is especially suited for implementing the inventive lens removal or demolding methods.

The phenomenal growth of the industry which is engaged in the manufacture of the evermore popular ophthalmic contact lenses, especially the aspects of the industry which pertains to the supplying of contact lenses which are intended for frequent periodic replacement by a wearer, has dramatically increased the need for the mass-production of immense quantities of such lenses which are of a consistently high quality while being inexpensive to produce. Consequently, commensurate with the foregoing needs of the industry, this has necessitated manufacturers of such lenses to strive for the development of automated methods and apparatuses which are particularly adaptable to high-speed automated production practices, and which perform with consistency at adequate degrees of accuracy or precision in a highly cost-effective and consequently economically viable manner.

Pursuant to the currently developed technology which is concerned with the production of ophthalmic lenses, particularly such as soft contact lenses of the hydrogel type, there is normally utilized a monomer or monomer mixture which is polymerizable in a plastic mold. Generally, although not necessarily, the material for the ophthalmic contact lenses is selected from a suitable hydrophilic material, preferably a monomer to form a so-called HEMA-based polymer (hydroxyethyl-methacrylate), although other suitable polymerizable monomers may also be employed for the lenses, as discussed further on hereinbelow.

2. Discussion of the Prior Art

Direct molding processes which are typically employed pursuant to the current state-of-the-art for the forming of soft hydrogel ophthalmic contact lenses may be readily found; for example, in the disclosures of U.S. Pat. No. 5,080,839 to Larsen; U.S. Pat. No. 5,039,459 to Larsen et al.; U.S. Pat. No. 4,889,664 to Larsen et al.; and U.S. Pat. No. 4,495,313 to Larsen. As elucidated in the above-mentioned U.S. patents, the processes for the forming of the soft ophthalmic contact lenses may include the steps of dissolving a monomer mixture and a non-aqueous, water-displaceable solvent, and thereafter placing the monomer and solvent mixture in a mold providing a mold cavity which is in the configuration of the finally desired hydrogel contact lens. Subsequently, the monomer and solvent mixture is subjected to physical conditions causing the monomer or monomers to polymerize, thereby producing a polymer and solvent mixture in the shape of the final hydrogel contact lens. After completion of the foregoing procedure, the solvent is displaced with water in order to produce a hydrated lens whose final size and shape are similar to the configuration of the original molded polymer and solvent article.

Basic molds which are utilized for receiving the polymerizable monomer feed material for the forming of the lenses are disclosed, for example, in U.S. Pat. No. 5,094,609 to Larsen; U.S. Pat. No. 4,640,489 to Larsen et al.; and U.S. Pat. No. 4,565,348 to Larsen. Ordinarily; for instance, as disclosed in U.S. Pat. No. 4,640,489, the mold which is employed consists of a two-piece mold having a female mold portion with a generally concave lens surface, and a male mold portion having a generally convex lens surface; and which is adapted to mate with the female mold portion, with both mold portions being preferably constituted of a thermoplastic material, such as polystyrene. As disclosed in the above-mentioned U.S. patent, polystyrene and copolymers thereof is considered to be a preferred mold material inasmuch as it does not crystallize during cooling of the hot melt which is utilized to form the lenses, and consequently exhibits little or no shrinkage when subjected to the processing conditions necessitated during the direct molding process, as discussed hereinabove. Alternatively, there may also be used suitable molds which are constituted of polypropylene or polyethylene; in essence, such as are described in specific detail in the disclosure of U.S. Pat. No. 4,121,896.

During the implementation of the molding process, the monomer and monomer mixture is supplied in an excess amount to the concavity of the concave female mold portion prior to the mating of the female and male mold portions. During the assembly of the male and female mold portions, which would conjointly define therebetween the lens-forming cavity between the concave and convex mold portions of the mold, and also provide for a perimetral lens edge, excess monomer or monomer mixture is expelled or squeezed out from the mold cavity and comes to rest on a flange or between flanges which surround one or both of the mated mold portions. Upon polymerization, this excess material which is derived from the monomer or monomer mixture produces an annular flange or ring of the HEMA-based material which is employed for producing each of the contact lenses so as to extend about the formed lens externally of the mold cavity between the flange structure of the mated male and female mold portions. In accordance with the disclosures of the above-referenced U.S. Pat. Nos. 5,039,459; 4,889,664; and 4,565,348, there is set forth the requirement that the materials for the mold and lens, and the chemistry and physical processes which are implemented during the molding sequence be controlled in a manner whereby the mated mold portions may be readily separated without the necessity for having to apply an undue force, which at times may be necessitated when the molded lens adheres to the lens mold, or in the event that the mated mold portions exhibit a tendency to stick to each other subsequent to the polymerization of the lens material.

Taking the foregoing into consideration, the processes pursuant to the prior art which are employed for separating the mold portions and for removing the molded lens therefrom, essentially comprise a preheating stage, a heating stage, and a physical or mechanical prying open and separating of the mold portions, and thereafter a lens removal procedure. The preheating and/or heating stage employed in the above mold separating and lens removal process contemplates the provision of applying heat to the back mold portion, normally the male or convex mold portion, generally through the application of a heated air stream, by means of convection. Inasmuch as the adhesive force which is present between the molded lens and a mold surface is a function of temperature; in effect, a higher temperature leads to a lower adhesive force. Accordingly, a temperature gradient across the lens can thus be used to keep the lens preferentially adhering to one mold half. This effect is at its greatest in the presence of a maximum thermal gradient.

More recent techniques which have been developed, or are currently in the process of being developed for the achieving of a temperature gradient between the male (back) lens mold portion and the contact lens, include processes involving laser lens demolding technology, such as is described in copending U.S. patent application Ser. No. 08/257,801, now abandoned, which is assigned to the common assignee of the present application; or through the implementation of steam impingement in order to generate the necessary temperature gradient, as described herein and in copending U.S. patent application Ser. No. 08/258,265, pending, which is also assigned to the common assignee of the present application; and wherein the disclosure of the above-identified applications are incorporated herein by reference.

At the present time, the procedure of physically prying apart the mated lens mold portions which contain the polymerized contact lens in a molding cavity which is located therebetween is adapted to be accomplished by the application of mechanical leverage, whereby the leverage or prying action may be implemented automatically from one side of the mated lens mold portions.

For example, the disclosure of U.S. Pat. No. 4,889,664, referred to hereinabove, discloses a test fixture which is employed to measure the forces which are required in order to open or separate the mated mold portions. The test fixture discloses a holding fixture for retaining the bottom half of the lens mold, and a lever structure which is positionable between the top mold half portion and the bottom mold half portion, and which engages the former so as to enable prying the top half mold portion away from the bottom half mold portion at a controlled rate of mold separation. Generally, such lever structure for prying apart the lens mold portions consists of a plurality of prying fingers which engage beneath the flange structure encompassing the upper mold half portion, the latter of which generally defines the back curve of the lens which is being molded, and the vertical lifting force imparted to the upper mold half portion by the therewith engaged prying fingers is normally sufficient to disengage the mating mold portions so as to enable separation thereof and afford access to the contents of the mold cavity; in effect, the molded ophthalmic contact lens. Since the prying is ordinarily effected from one side of the flange structure of the upper or back curve mold half portion, and the opposite side is unsupported, the back mold half portion tends to pivot on the bottom or front curve mold portion so as to squash the material at the edge of the lens contained therebetween. This is potentially a source of possible damage being imparted to the contact lenses during mold separation, rendering the lenses unusable and the lens manufacturing process economically not viable for mass production techniques.

SUMMARY OF THE INVENTION

In order to further improve upon the mechanical prying apart of such mating mold half portions, and to facilitate this procedure at a reduced application of force, while concurrently potentially preventing or at least appreciably ameliorating the extent of any possible sticking together of the mold half portions, the mechanical leverage applied to the upper mold half portion, in addition to the application of the heating action thereto, either through steam, infrared lamp or laser impingement, contemplates imparting a motion to the prying finger relative to the perimeter of the upper mold half contacted thereby so as to apply a predetermined pattern of motion to the prying fingers engaging the flange of the upper mold half while concurrently effectuating the lifting action. This, in essence, causes the upper mold half portion to be gradually separated from the lower mold half portion at a controlled varying rate and at a specified angular orientation therebetween, ensuring that the separation between the mated mold half portions may be implemented in the most advantageous and expedient manner, while concurrently reducing or even completely inhibiting the danger of any potential damage being encountered by the mold half portions and the molded lens in carrying out this particular lens demolding procedure.

Accordingly, it is an object of the present invention to provide a method for facilitating the expedient and uniformly controllable separation of mating contact lens mold portions which have a contact lens formed in a mold cavity located therebetween in the absence of damage being encountered by the lens or mold components during the lens demolding procedure.

Another object of the present invention resides in the provision of a lens demolding method of the type described herein whereby the separation of the upper mold half portion from the lower mold half portion is implemented in an angular or tilted lifting orientation by controlling the mechanical leverage exerted against the upper mold half portion in a predetermined rotational or vertical operative lifting pattern extending about the perimeter of the lens mold.

A further object of the present invention is to provide a method of implementing the separation between mating mold half portions of the lens mold in the absence of any excessive environmental heating or uneconomical use and potential waste of energy during the implementation of the mechanical mold separation process.

Yet another object of the present invention resides in the provision of an apparatus for implementing the mold separating process as described hereinabove.

A more specific object of the present invention relates to the provision of an apparatus for implementing a separation process between mating mold half portions having an ophthalmic hydrophilic contact lens formed in a molding cavity located therebetween, in which the apparatus includes a mechanical leverage-exerting fixture for engaging the periphery of an upper mold half portion in a predetermined rotational pattern of lifting movement extending about the lens mold concurrently with the generation of a temperature gradient so as to facilitate the controlled separation between the mold half portions while minimizing the risk of any potential damage being encountered by the mold parts and the contact lens.

BRIEF DESCRIPTION OF THE DRAWINGS

Reference may now be had to preferred embodiments of apparatuses for the demolding of ophthalmic contact lenses from mold assemblies each consisting of mating upper (back curve) lens mold halves and lower (front curve) lens mold halves, taken in conjunction with the accompanying drawings; in which:

FIG. 4a illustrates a side elevational sectional view of the front curve mold half, taken along line 4—4 in FIG. 3;

FIG. 4b illustrates, on an enlarged scale, the encircled portion of FIG. 4a;

DETAILED DESCRIPTION

Figure 1:
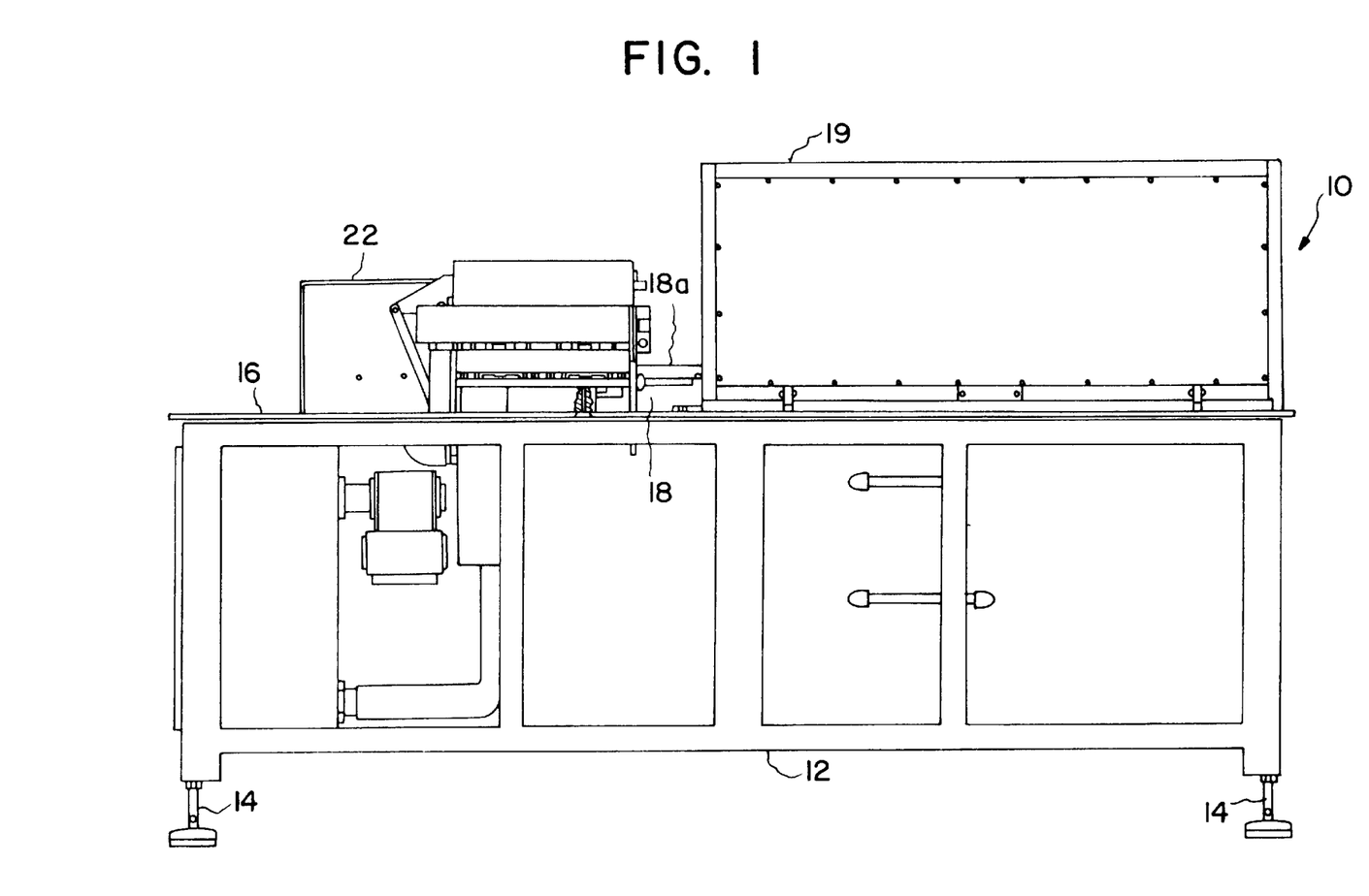
FIG. 1 illustrates, generally diagrammatically, an overall side elevational view of a lens demolding and mold separating apparatus pursuant to the invention.
Figure 2:
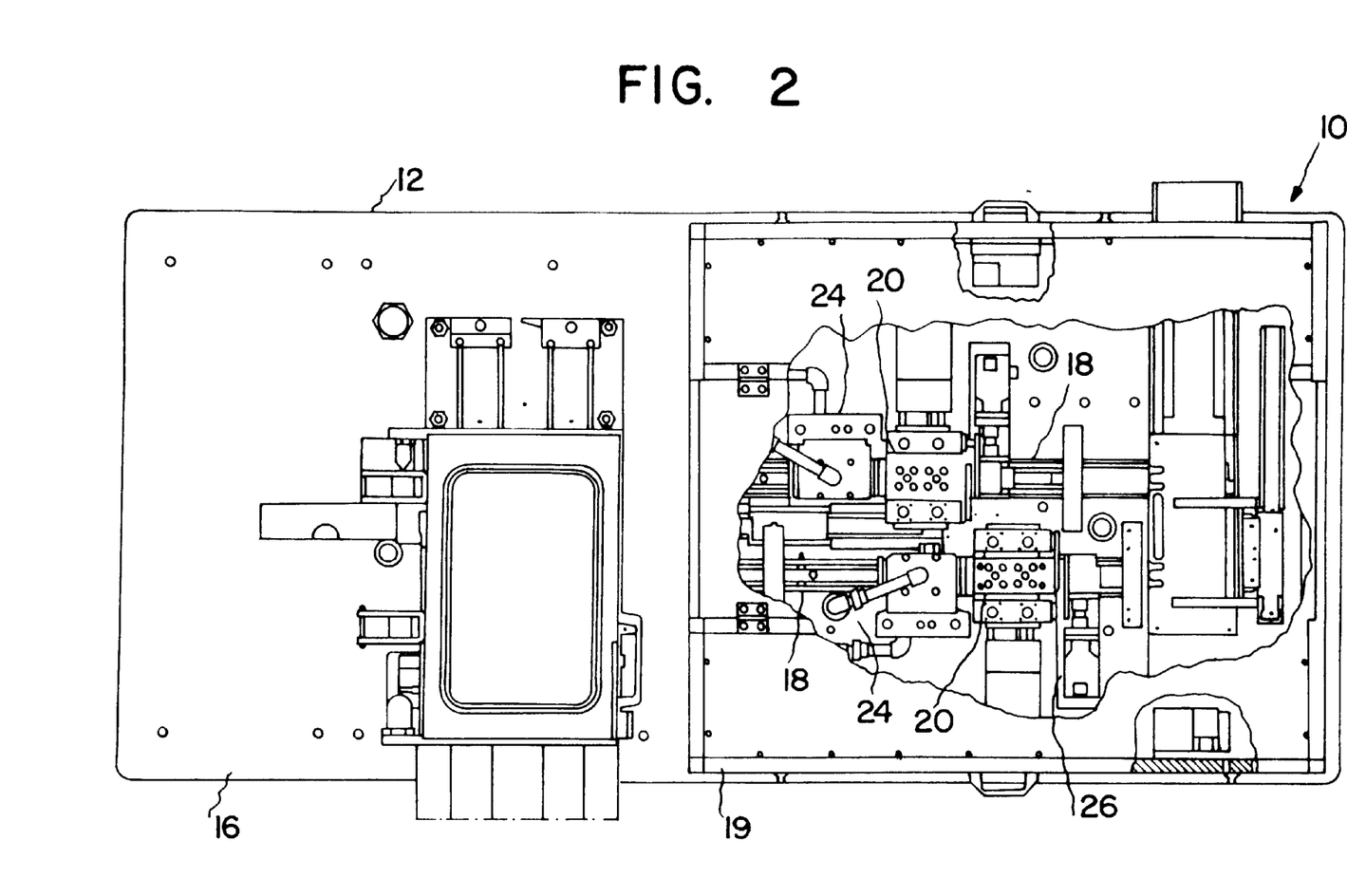
FIG. 2 illustrates a plan view of the apparatus of FIG. 1.

Referring in specific detail to the drawings, shown in FIGS. 1 and 2 is a demolding module or apparatus 10 for the separation of mold halves employed in the forming of ophthalmic contact lenses, as described in detail hereinbelow.

The module or apparatus 10 is adapted to be a constituent of a lens production line, such as is described in detail in copending U.S. patent application Ser. No. 08/258,654, pending, the disclosure of which is incorporated herein. The apparatus 10 includes a frame structure 12 having support legs 14 on which there is located a platform 16. Positioned on the platform or surface 16 is a transport conveyor system 18, with the apparatus 10 being enclosed within a suitable housing 19, as described in the above-mentioned application, along which system pallets 20 each supporting a plurality of contact lens molds are adapted to be advanced, preferably in a double line formed by a dual-walking beam arrangement extending in a parallel relationship.

The demolding apparatus 10 is located downstream of a curing oven arrangement 22 for polymerizing the lenses located in the mold assemblies during movement of the pallets 20 along their paths of conveyance, and also provides for the mechanisms and mode of operation of the components 24 utilized for heating the lens mold portions and the mechanical structure 26 for separating the lens mold halves from each other in order to enable removal of the molded lenses therefrom. Specific details regarding the structure and functioning of the mechanical lens mold separating device are set forth hereinbelow with respect to FIGS. 9 through 13 of the drawings.

Figure 3:
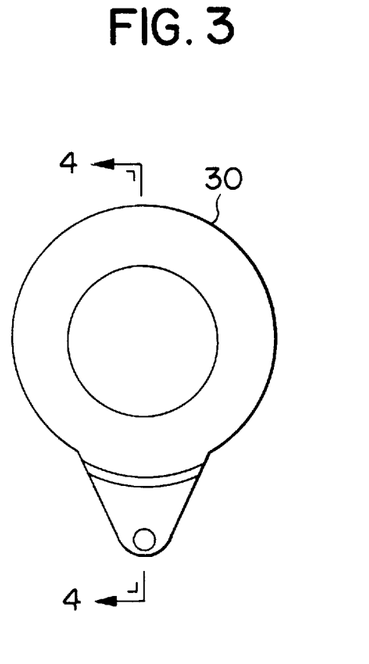
FIG. 3 illustrates a top plan view of one embodiment of a front (or female) curve mold half for molding a contact lens.
Figures 4A, 4B:
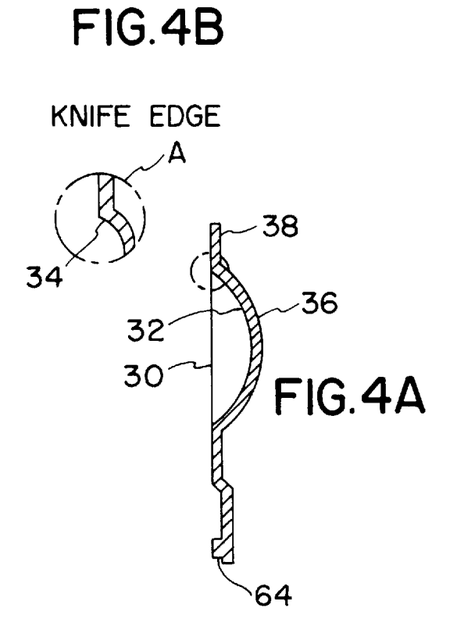

FIGS. 3, 4a and 4b illustrate, respectively, top elevational and sectional side views of one embodiment of a first or front mold half 30 useful in the production of a contact lens by the polymerization of a monomer or monomer mixture in a mold assembly composed of two complementary front and base mold halves. The front mold half 30 is preferably formed of polystyrene but could be any suitable thermoplastic polymer such as mentioned hereinabove which is sufficiently transparent to ultraviolet light to allow irradiation therethrough with light to promote the subsequent polymerization of a soft contact lens. A suitable thermoplastic such as polystyrene also has other desirable qualities such as being moldable to surfaces of optical quality at relatively low temperatures, having excellent flow characteristics and remaining amorphous during molding, not crystallizing, and evidencing minimal shrinkage during cooling.

The front mold half 30 defines a central curved section with an optical quality concave surface 32, which has a circular circumferential knife edge 34 extending therearound. The edge 34, shown in detail A of FIG. 4, is desirable to form a uniform plastic radius parting line (edge) for the subsequently molded soft contact lens. A generally parallel convex surface 36 is spaced from the concave surface 32, and an annular essentially uniplanar flange 38 is formed extending radially outwardly from the surfaces 32 and 36 in a plane normal (perpendicular) to the axis (of rotation) of the concave surface 32. The concave surface 32 has the dimensions of the front curve (power curve) of a contact lens to be produced by the front mold half, and is sufficiently smooth such that the surface of a contact lens formed by polymerization of a polymerizable composition in contact with the surface is of optically acceptable quality.

Figure 5:
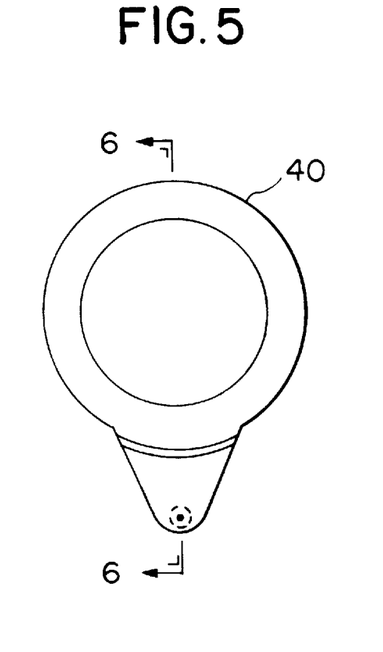
FIG. 5 illustrates a top plan view of a back (or male) curve mold half adapted to mate with the front curve mold half of FIGS. 3 and 4.
Figure 6:
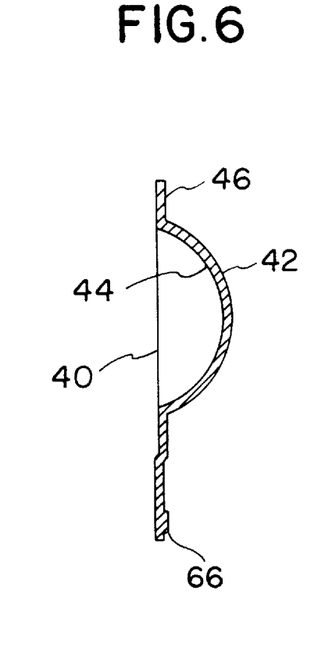
FIG. 6 illustrates a side elevational sectional view of the back curve mold half, taken along line 6—6 in FIG. 5.

FIGS. 5 and 6 illustrate, respectively, top elevational and side views of one embodiment of a second, or back curve mold half 40. The back curve mold half is designed with all of the same design considerations mentioned hereinabove with respect to the front curve mold half 30.

The back curve mold half 40 is also preferably formed of polystyrene but could be any suitable thermoplastic such as those mentioned hereinabove which is transparent to ultraviolet light. The back curve mold half 40 defines a central curved section with an optical quality convex surface 42, a generally parallel concave surface 44 spaced from the convex surface 42, and an annular essentially uniplanar flange 46 formed extending radially outwardly from the surfaces 42 and 44 in a plane normal to the axis (of rotation) of concave surface 44. The convex surface 42 has the diminished dimensions of the rear curve (which rests upon the cornea of the eye) of a contact lens to be produced by the base mold half, and is sufficiently smooth such that the surface of a contact lens formed by polymerization of a polymerizable composition in contact with the surface is of optically acceptable quality.

The monomer and monomer mixtures for producing the contact lenses to which this process may be directed include copolymers based on 2-hydroxyethyl methacrylate ("HEMA") and one or more comonomers such as 2-hydroxyethyl acrylate, methyl acrylate, methyl methacrylate, vinyl pyrrolidone, N-vinyl acrylamide, hydroxypropyl methacrylate, isobutyl methacrylate, styrene, ethoxyethyl methacrylate, methoxy triethyleneglycol methacrylate, glycidyl methacrylate, diacetone acrylamide, vinyl acetate, acrylamide, hydroxytrimethylene acrylate, methoxyethyl methacrylate, acrylic acid, methacryl acid, glyceryl methacrylate, and dimethylamino ethyl acrylate.

Figure 7:
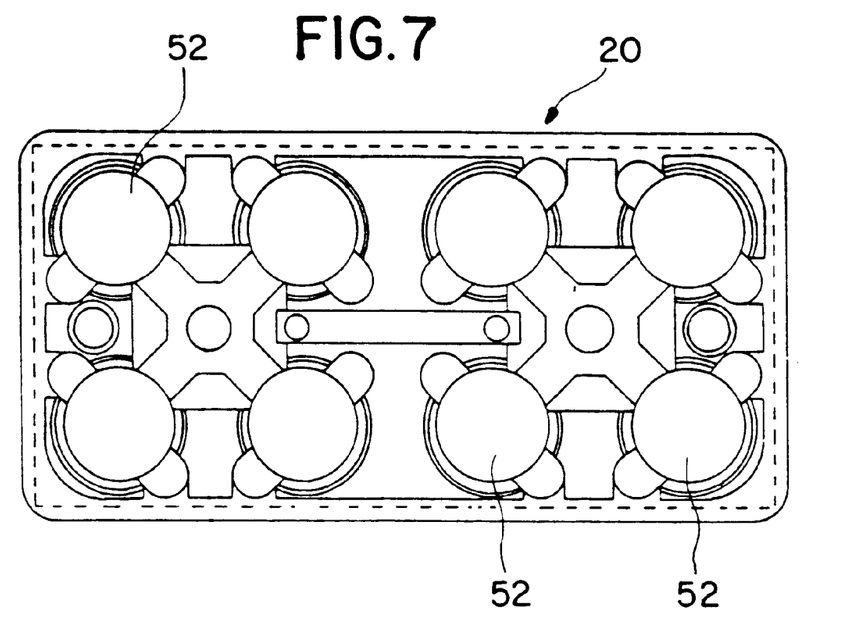
FIG. 7 illustrates a top plan view of a pallet which is employed to transport a plurality of contact lens molds throughout a contact lens production facility.

A top view of a production line pallet 20 for carrying the above-mentioned lens mold halves is illustrated in FIG. 7, it being understood that all pallets 20 are interchangeable in that they may accommodate either front curve or back curve contact lens mold halves 30 or 40. In the embodiment shown in FIG. 7, the pallet 20 is formed of aluminum, whereas in another embodiment, the pallet 20 may be formed of stainless steel.

Each pallet 20 contains a plurality of recesses for receiving a respective contact lens mold assembly 50 comprising complimentary front and back curve mold halves 30 and 40 which jointly define the shape of the final desired lens. One such mold assembly 50 is shown seated within a recess 52 of the pallet in FIG. 8. The contact lenses are formed by placing an amount of polymerizable monomer or monomer mixture in each front curve (concave) mold half 30 seated within a pallet recess 52. Then, the back curve (convex) mold half 40 is placed onto the polymerizable composition 60 with the first and second mold halves aligned so that their axes of rotation are collinear and the respective flanges 38,46 are parallel.

When desired, there may be effected the deposition of a thin and uniform layer or film of a surfactant onto specified flange surfaces of the front curves 30 prior to the assembling of the mold halves 30, 40 so as to enable easier subsequent separation of the back curves 40 therefrom and the concurrent removal of the HEMA-based ring material with the back curves 40. This avoids the step of having to manually remove the remnants of the excess material rings formed by molding material excessed during the molding of the hydrophilic polymer contact lenses, and avoids contamination of the final package or the production line equipment that results from inadvertent error inherent in manual operations.

Figure 8:
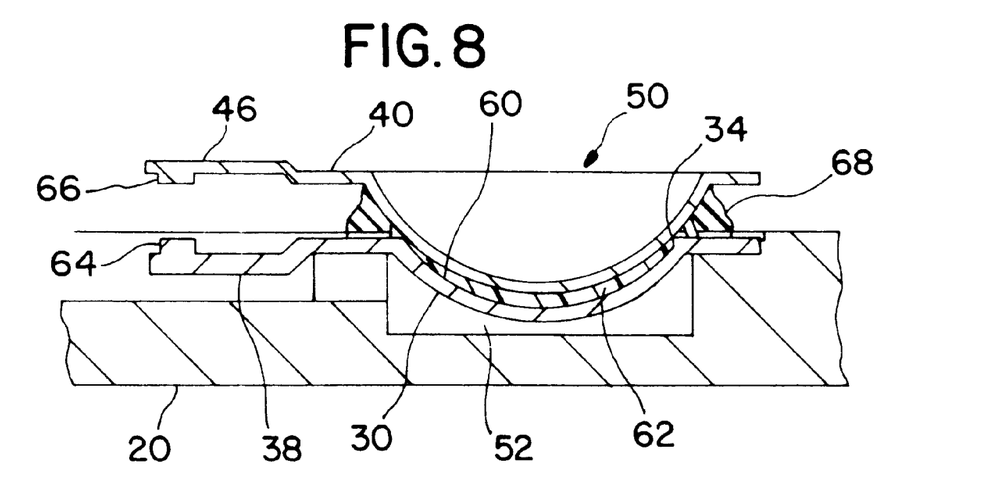
FIG. 8 illustrates a cross-sectional view of a pair of assembled mold halves constructed pursuant to FIGS. 3 through 6, shown supported and registered in a pallet cavity.

As illustrated in FIG. 8, a complimentary pair of front and back curve mold halves 30, 40 define the mold cavity 62 and the shape of the final desired lens. After the dosing step in a filling apparatus, in which the front concave mold half 30 is substantially filled with a polymerization mixture, the concave front mold half 30 is covered with the back curve mold half 40 under a vacuum to ensure that no air bubbles are trapped between the mold halves. The back curve mold half 40 is then brought to rest on the circumferential edge 34 of the concave front mold half 30 to sever the incipient lens from the excess monomer, to ensure that the resultant lenses are properly aligned and without distortion, and to form the mold assembly 50 which includes both mold halves 30, 40 and the incipient lens.

The excess monomer or monomer mixture displaced from the mold cavity forms an excess material ring 68, which preferentially adheres to the underside of flange 46 of back curve mold half 40 by reason of an applied surfactant coating on flange 38 of the front curve mold half 30. The surfactant may be applied through the intermediary of an apparatus and method as described in copending U.S. patent application Ser. No. 08/258,263, now U.S. Pat. No. 5,542,978, the disclosure of which is incorporated herein by reference.

During a precuring procedure, with the mold halves being again clamped together, subsequent to initial assembly thereof, the polymerization mixture is then exposed to actinic light, preferably from a UV lamp. Typically the mold halves 30, 40 are clamped for approximately 40 seconds with 30 seconds of actinic radiation. At the completion of the precure step, the polymerization mixture has formed a partially polymerized gel, with polymerization initiated throughout the mixture. Following the precure step, the monomer/solvent mixture is then cured in a UV oven apparatus 22, as shown in FIGS. 1 and 2, whereby polymerization is completed in the monomer(s). This irradiation with actinic visible or ultraviolet radiation produces a polymer/solvent mixture in the diminished shape of the final desired hydrogel lens.

After the polymerization process is completed, the two halves 30, 40 of the mold are separated during a demolding step leaving the contact lens in the first or front curve mold half 30, from which it is subsequently removed. It should be mentioned that the front and back curve mold halves are used for a single molding and are then normally discarded.

As illustrated in FIGS. 1 and 2, the pallets 20 containing the polymerized contact lenses in the mold assemblies 50 exit the polymerization apparatus along two conveyors, i.e. dual-walking beams, and enter into the lens demolding and mold separating apparatus 10. The pallets 20 are transferred from their conveyors and positioned on a support 18a along a respective transport carrier of a dual walking beam conveyor 18. As described in copending U.S. patent application Ser. No. 08/258,654, pending, the transport carrier comprises a plurality of respective spaced apart push blocks which move horizontally so as to precisely transport pallets 20 containing mold assemblies 50 into position within end through the demolding apparatus 10.

In the preferred embodiment described in detail in the copending application referred to hereinabove, the transport carriers of the dual walking beam conveyor 18 carry the pallets 20 containing contact lens mold assemblies 50 into the demolding apparatus 10 where, preferably, the flange portions of the front curve and back curve mold halves are respectively restrained and gripped and pulled away from each other, either in directly opposite directions or through a subtended angular relationship therebetween in a prying type of motion. Advantageously, each contact lens mold assembly 50 is first heated moderately to facilitate separation of the polymerized contact lens article from the mold half surfaces. As explained in further detail in co-pending U.S. patent application Ser. No. 08/258,265, pending, entitled "Mold Separation Apparatus" and which is assigned to the same assignee as the instant invention, the demolding apparatus 10 includes means for applying a precise amount of heat, which may be in the form of steam or laser energy, to the back curve lens mold portion 40 of the contact lens mold assembly 50, prior to prying apart the back curve mold half 40 from the front curve mold half 30 by a set of pry fingers that are inserted within the gap formed between the overlying flange portions of each mold half of the mold assembly.

The formation of the temperature gradient is of significance, as previously mentioned. As mentioned hereinabove, the adhesive force which is present between the molded lens and a mold surface is a function of temperature; in effect, a higher temperature leads to a lower adhesive force. Accordingly, a temperature gradient across the lens can thus be used to keep the lens preferentially adhering to one mold half. This effect is greatest when there is maximum thermal gradient. As time continues, heat is lost through conduction from the back mold portion 40 into the lens polymer and the front mold portion 30, and then collectively into the surrounding environment. The heated back mold portion is, therefore, promptly removed so that very little energy is transferred to the polymer lens, thereby avoiding the possibility of thermal decomposition of the lens.

Pursuant to alternate embodiments, there are contemplated two different ways of heating the back curve mold half 40 and demolding the mold assembly 50. In one of these two embodiments, heating the back curve mold half 40 may be accomplished by the use of a source of electromagnetic radiation, preferably a carbon dioxide ($CO_2$) laser, applied to at least one of the mold portions. The laser is preferably of about 80 Watts at a wavelength of 10.6 $\mu$m. The exposure of the mold portion to the laser is between one half and one second.

The above objectives are attained by use of a source of electromagnetic radiation, preferably a carbon dioxide ($CO_2$) laser, applied to at least one of the mold portions and may be split into two beams to simultaneously heat the back curve of two mold assemblies 50.

In an embodiment for effecting mold heating, two mated mold portions 30, 40 containing a polymerized lens therebetween can be simultaneously heated by means of the apparatus.

The second of the two embodiments for heating each back curve mold half 40 and demolding the mold assembly 50 uses steam as a high energy heat source. The mold separation apparatus of the second embodiment generally comprises steam heating apparatus 24 for heating the molds and two associated mechanical demolding devices 26, shown diagrammatically in FIGS. 1 and 2 for accomplishing the simultaneous demolding of two parallel lines of a plurality of contact lens molds 50 supported on pallets 20 and each containing an ophthalmic lens therein. The use of two parallel lines, such as dual walking beams, increases the throughput of the lens production line.

The above-referenced embodiments for heating the mold parts are fully described in copending U.S. patent application Ser. No. 08/258,654, pending, assigned to the common assignee of the present application, and the disclosure of which is incorporated herein by reference.

The mechanical demolding assemblies or devices 26 of the mold separation apparatus 10 each mechanically pry the back curve mold half 40 from the front curve half 30 of each contact lens mold assembly 50 to physically expose each polymerized contact lens situated in the lens mold for conveyance to a hydration station for hydration of the lenses. The prying process occurs under carefully controlled conditions, as explained in detail below, so that the back curve half 40 will be separated from the front curve half 30 without destroying the integrity of the lens formed in the lens mold. To accomplish this, the mold separation apparatus 10 first prepares the back curve half 40 of each lens mold assembly 50 to enable quick and efficient removal from its respective front curve 30 by applying a predetermined amount of heat, as previously mentioned, preferably in the form of a laser or steam, to the outer back curve half surface 44.

Referring now in particular to the prying tool arrangement and operation for separating the front and back mold halves 30, 40, reference may now be had to the generally diagrammatic representations of FIGS. 9 through 13 of the drawings.

Figure 9:
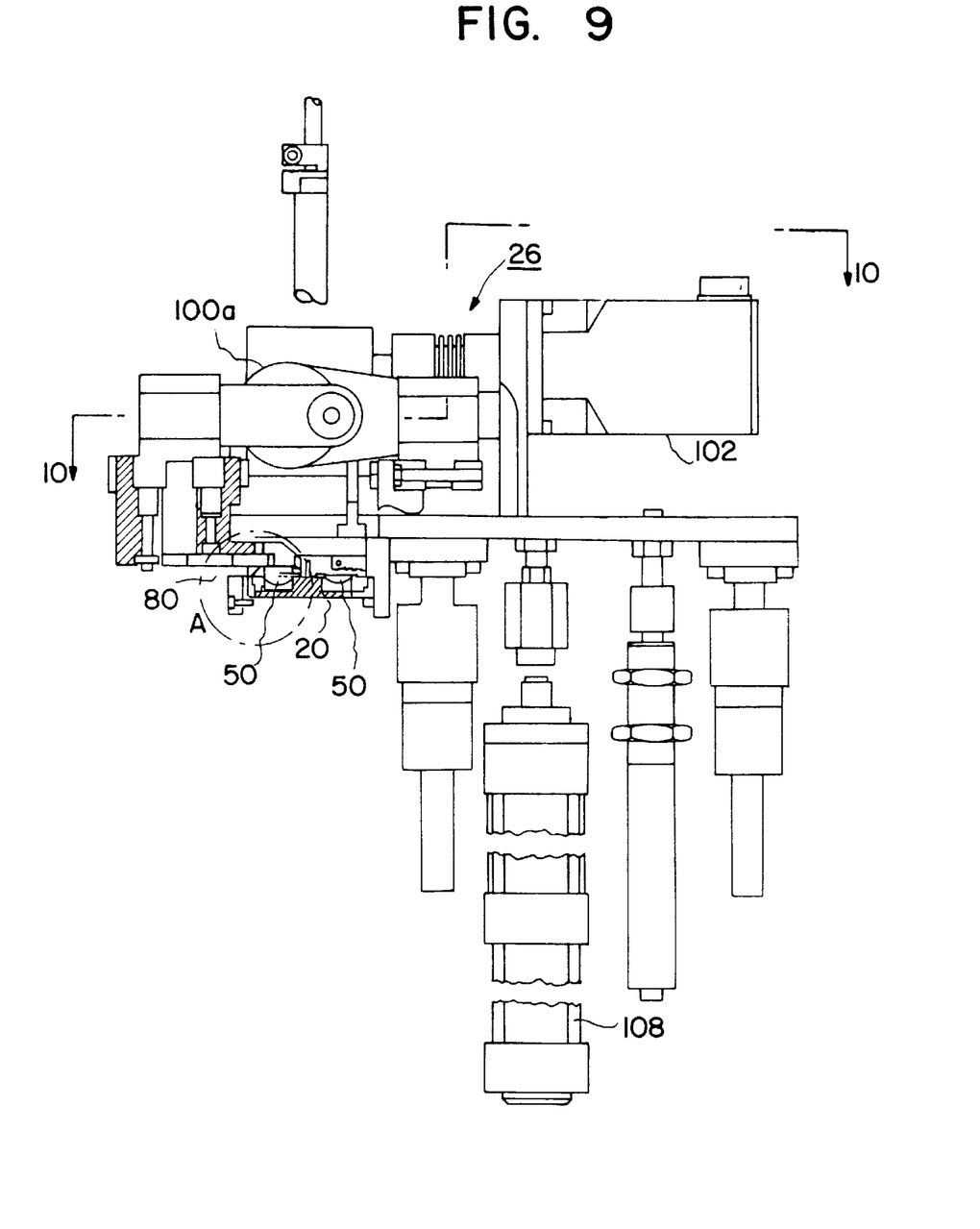
FIG. 9 illustrates, in a sectional end elevational view, a portion of the demolding apparatus which is employed for mechanical prying apart or separating the mold halves.
Figure 10:
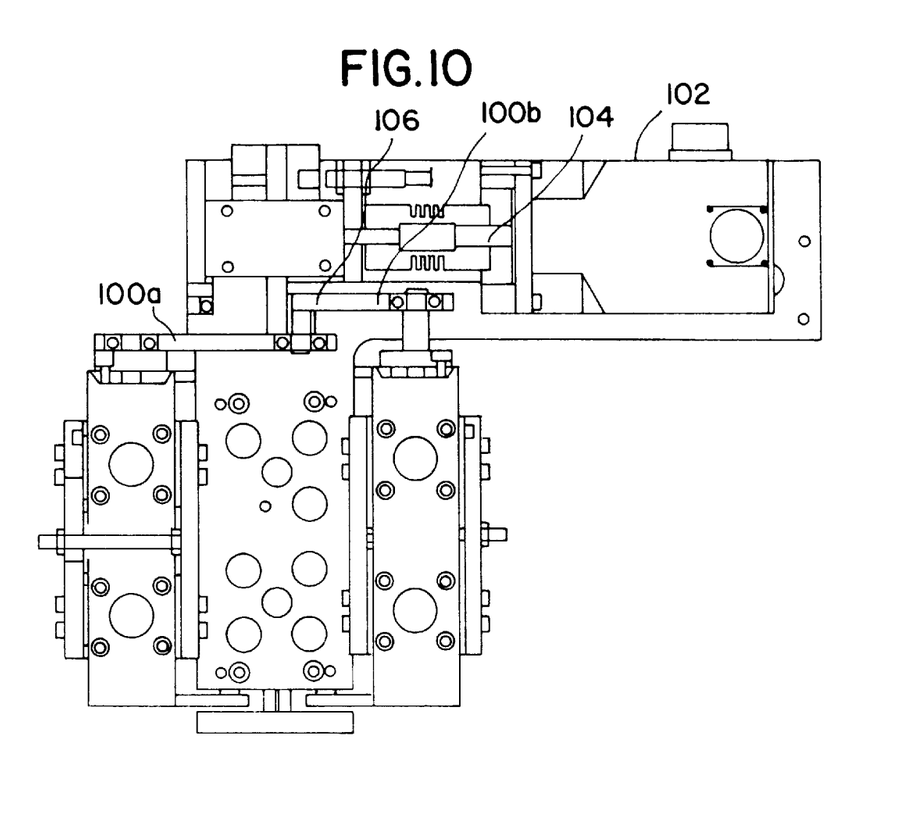
FIG. 10 illustrates a plan view, partly in section, taken generally along line 10—10 in FIG. 9.

As illustrated in FIGS. 9 and 10 of the drawings, showing a prying tool assembly 80 of the mechanical lens mold separating device 26 in respectively elevational end view and top plan view (partly in section), a pallet 20 containing a plurality of contact lens mold assemblies 50, in a pair of rows, is shown as having been advanced to the demolding module 10 on the support 18a of a dual walking beam 18, shown in FIG. 2.

Figure 11:
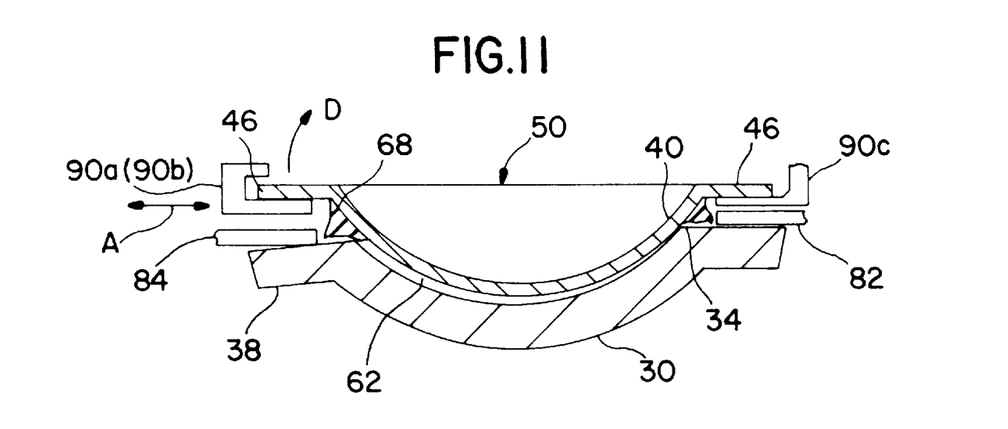
FIG. 11 illustrates diagrammatically the mold halves in the process of being separated.
Figure 12:
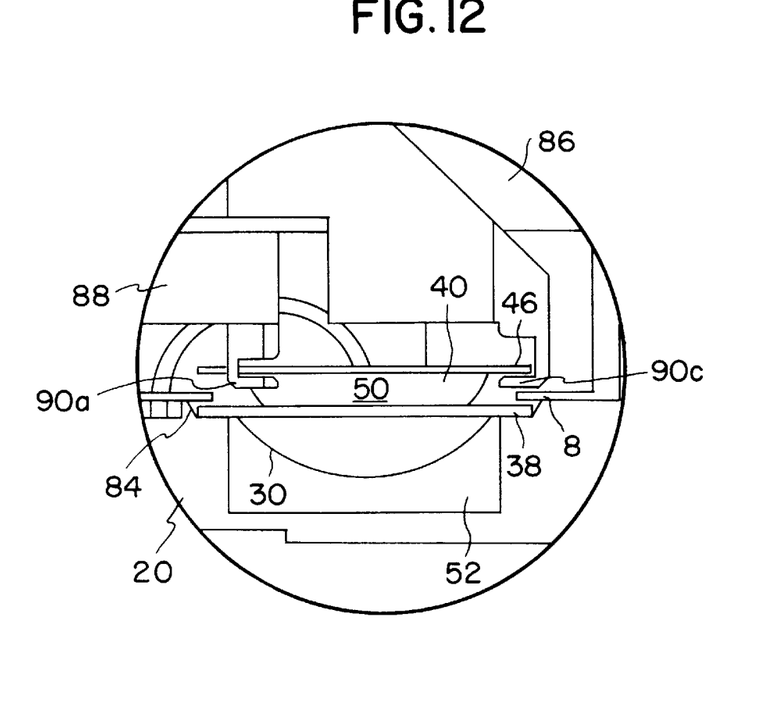
FIG. 12 illustrates, on an enlarged scale, a portion of the mold halves separating structure, shown in the encircled portion A of FIG. 9.

The demolding module or apparatus 10 includes an inverted T-bar structure 82 and horizontally extending lower fingers 84 which are stationarily positioned above the upwardly facing flange surface of each respective front mold curve half 30, as shown in FIGS. 11 and 12 of the drawings, in order to prevent the front mold curve half 30 from being lifted out of the cavity 52 in which it is located in the pallet 20 during the prying apart and separation of the front and back mold curve halves 30, 40 in the demolding and mold separating apparatus 10. These fingers 84 may also, if desired, extend along both sides of the tab 64 extending from the front curve mold half 30 so as to secure the latter against rotation in the recess 52 of pallet 20 during the mechanical prying apart of mold curve halves 30 and 40.

Figure 13:
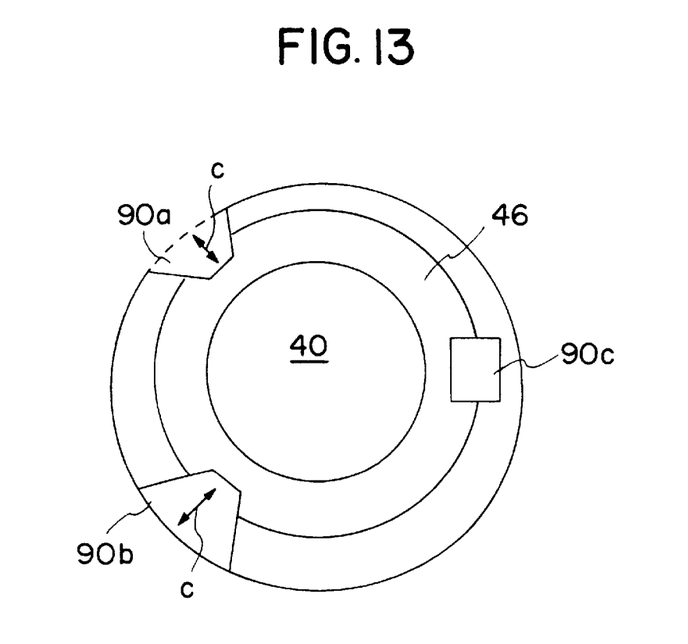
FIG. 13 illustrates a bottom view of the pry fingers of the structure shown in FIG. 12.

Concurrently, with the foregoing, an upper prying structure 86 including an inverted pry bar arrangement 88 is adapted to have pry fingers 90a and 90b adapted to be moved into selective engagement beneath the flange portion 46 of the back or male mold curve half 40, as shown in FIGS. 11, 12 and 13, and wherein pry fingers, which are shown in more specific detail in FIGS. 12 and 13 of the drawings, are located about the periphery of the flange so as to extend therebeneath in an essentially spaced arrangement as shown in FIG. 13. In this particular instance, the pry bar arrangement 88 comprises three of the pry fingers 90a, 90b and 90c of which at least the first two are movable towards and away from each other in the direction of arrows C. Two of the prying fingers 90a and 90b are located spaced close to each other so as to engage beneath one end of the flange portion 46, whereas pry finger 90c is located so as to form a support proximate the opposite end of the flange 46 portion of a back curve mold half 40, as described hereinbelow.

Referring to FIGS. 9, 10, 12 and 13, operating structure of the mold separation apparatus 10 which is adapted to activate the pry fingers 90a, 90b and 90c beneath the flange portion 46 of the back or male mold curve half 40 of a mold assembly 50 is now described in detail. As shown in the drawings, the pry fingers 90a, 90b are movable radially outwardly and inwardly along the direction of arrows A, so as to be positionable in place beneath the flange portion 46 of the back mold curve half 40 while at the same time the stationary finger 84 and T-bar 82 retains the therewith associated flange portion 38 of the front curve mold half 30 in position in recess 52 on the pallet 20.

Movement is imparted to the pry fingers 90a, 90b of the pry bar arrangement through operative structure comprising rotatable cams 100a, 100b actuated from a drive motor 102 through suitable drive shaft interconnections 104, 106, as shown in FIG. 10. This movement may be a rotational or tilting displacement imparted to pry fingers 90a and 90b in the direction of arrow D which, in conjunction with a lifting action imposed through a hydraulic piston unit 108, will cause the one end of the back mold half 40 to be lifted away from the front mold half 30 at an angular tilt. The pry finger 90c serves to prevent the opposite end edge of the mold part 40 from sliding down during mold separation, so as to inhibit the lens contained in the cavity 62 of mold part 30 from being squashed and resultingly damaged.

In order to control the separating action between the mold halves 30 and 40 so as to prevent any breakage of the mold half 40, the rotatable cams 100a, 100b provide for an intermittent and controlled rotational and thereby angular displacement of pry fingers 90a and 90b to produce a desired separating wavefront propagating at a constant velocity across the back mold half 40. In essence, the initial tilting of the pry fingers may be to take up slack or tolerance gaps with regard to the flange surface on the back mold half which is contacted by the pry fingers, and may entail a fast movement of the cams. Thereafter, a stop or slow movement in combination with a lifting action may produce a slow wavefront propagation; followed by a fast movement through an excess material ring break away from the flange of the front mold half 30. The foregoing sequence may be readily varied to conform with the requirements of different types of mold assemblies 50 or kinds of materials employed.

At the point in time when it is desired to separate the mold halves 30 and 40, a vertical lifting action is exerted against the prying fingers 90a through 90c engaging beneath the flange 46 of the male mold curve half 40, in the direction of arrow D as shown in FIG. 11, and the selective rotational movement intermittently imparted to the pry fingers of the apparatus represented in the drawings so as to implement the lifting effect at controlled rates extending across the periphery of the flange 46. The rotational pivoting of the pry fingers 90a and 90b about an axis extending perpendicular to the plane of the flange 46 of the back curve mold half 40 may be essentially intermittent or incremental stop-and-go at varying speeds and of only a few degrees, adequate to impart an angular upward lift to the flange 46 so as to provide a tilting and increasingly progressive "wavefront" like separating action between the mold halves 30 and 40. In effect, this will provide a gradual and controlled separation between the mold halves 30, 40, as shown in FIG. 11, from one end towards the opposite end so as to enhance the ease of separation between the two mold half portions while lessening the possibility of the contact lens which is located in the cavity of the front mold curve half 30, from being damaged. This lifting action of the back curve mold half 40 also causes the excess material ring, which was formed during the polymerization of the contact lens, to be raised in adherence to the upper or back curve mold half 40. Upon completion of the mold separation sequence, the front mold halves 30 with the contact lenses disposed therein are then conducted out of the demolding apparatus 10 while supported on pallet 20. The back mold halves 40 (with excess material rings possibly still adherent thereto) are then released from engagement with the pry fingers 90a through 90c by operation of the rotatable cams 100a, 100b as controlled by drive motor 102, so as to drop into disposal bins which have been moved into place therebeneath. The thus separated back curve mold halves 40 which are dropped into the bins (not shown) are conveyed out of the apparatus 10 for disposal.

Thereafter, the pallets 20 containing the front curve mold halves 30 with exposed contact lenses therein are subsequently transported to a hydration station for hydration and demolding from the front curve lens mold, inspection and final packaging.

In principle, it is also possible to contemplate that the front curve is pryed off the back curve and the contact lens remains with the back curve rather than with the front curve during the demolding process.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. A method of separating a back mold half from a front mold half of a contact lens mold assembly having a cavity between said mold halves for the formation therein of a contact lens, said back mold half having a central convexly curved surface surrounded by an outwardly extending flange portion and said front mold half having a central concavely curved surface surrounded by an outwardly extending flange portion; said mold separating method comprising the steps of:
    a) applying a restraining force to one said mold half for maintaining said mold half in a fixed position;
    b) imparting heat to said other mold half so as to provide a temperature differential between said mold halves; and
    c) applying a vertical lifting movement and a rotational force to said other mold half proximate one edge portion thereof in a predetermined selective controlled operatively interrelated angular tilting and vertical motion pattern while maintaining the restraints on said one mold half so as to effectuate gradual separation between said mold halves propagating from said one edge portion towards an oppositely located edge portion between said mold halves.

2. The method as claimed in claim 1, wherein said restrained mold half comprises said front mold half.

3. The method as claimed in claim 2, wherein first finger means are extended over the flange portion of said front mold half for fixedly restraining said front mold half in a mold pallet; a plurality of pry fingers are extended below the flange portion of said back mold half, and said predetermined controlled angular tilting and vertical motion being imparted to at least one of said pry fingers at said one edge portion for angularly separating said back mold half from said front mold half.

4. The method as claimed in claim 3, wherein said plurality of pry fingers are circumferentially spaced about said flange portion of said back mold half and impart intermittent upwardly pivoting rotational movement to said back mold half in correlation with said vertical lifting motion so as to gradually separate said mold halves in an angularly tilted separating orientation extending from said one edge portion towards said opposite edge portion.

5. The method as claimed in claim 4, wherein said rotational movement rotates said back mold half relative to said front mold half.

6. The method as claimed in claim 1, wherein said imparting heat comprises heating a surface of said back mold half.

7. The method as claimed in claim 6, wherein said heating of the back mold half surface is effectuated through the application of heated steam.

8. The method as claimed in claim 6, wherein said heating of the back mold half surface is effectuated by laser heating.

9. The method as claimed in claim 3, wherein said restraining force for maintaining said one mold half in fixed position comprises positioning restraining finger members above the flange portion of said one mold half.

10. The method as claimed in claim 1, wherein said heat is propagated across the surface of said other mold half so as to provide a temperature gradation over said mold half surface.

11. The method as claimed in claim 1, wherein said other mold half is heated to a temperature higher than the temperature of the contact lens contained in said mold assembly.

12. The method as claimed in claim 9, wherein said flange portions of said mold halves are in parallel spaced superposition, said restraining finger members for retaining said front mold half in fixed position and said pry fingers for separating said back mold half from said front mold half extending into the space between said flange portions.

13. The method as claimed in claim 12, wherein the surface of the flange portion of said front mold half is coated with a surfactant so as to enable a ring of lens molding material formed between said flange portions to adhere to the flange portion of said back mold half upon said back mold half being separated from said front mold half.

14. The method as claimed in claim 4, wherein at least two of said pry fingers engage the flange portion of said back mold half so as to cause said back mold half to rotate in unison with incremental rotational displacement imparted to said pry fingers.

15. The method as claimed in claim 1, wherein a vertical lifting motion is imparted to said other mold half from two opposite sides thereof to generate balanced forces to inhibit damage being encountered by the contact lens.

16. An apparatus for separating a back mold half from a front mold half of a contact lens mold assembly having a cavity between said mold halves for the formation therein of a contact lens, said back mold half having a central convexly curved surface surrounded by an outwardly extending flange portion and said front mold half having a central concavely curved surface surrounded by an outwardly extending flange portion; said mold separating apparatus comprising:

a) means for applying a restraining force to one said mold half for maintaining said mold half in a fixed position;

b) means for imparting heat to said other mold half so as to provide a temperature differential between said mold halves; and c) means for applying a vertical lifting movement and means for imparting a rotational force to said other mold half proximate one edge portion thereof in a predetermined selective controlled operatively interrelated angular tilting and vertical motion pattern while maintaining the restraint on said one mold half so as to effectuate gradual separation between said mold halves propagating from said one edge portion towards an oppositely located edge portion between said mold halves.

17. The apparatus as claimed in claim 16, wherein said restrained mold half comprises said front mold half.

18. The apparatus as claimed in claim 17, wherein first finger means are extended over the flange portion of said front mold half for fixedly restraining said front mold half in a mold pallet; a plurality of pry fingers are extended below the flange portion of said back mold half, and said predetermined controlled angular tilting and vertical motion is imparted to at least one of said pry fingers at said one edge portion for angularly separating said back mold half from said front mold half.

19. The apparatus as claimed in claim 18, wherein said plurality of pry fingers are circumferentially spaced about said flange portion of said back mold half and constitute means to impart intermittent upwardly pivoting incremental rotational movement to said back mold half in correlation with said vertical lifting motion so as to gradually separate said mold halves in an angularly tilted separating orientation extending from said one edge portion towards opposite edge portion.

20. The apparatus as claimed in claim 19, wherein said means to impart rotational movement angularly displaces said back mold half relative to said front mold half.

21. The apparatus as claimed in claim 16, wherein said means for imparting heat applies heat to a surface of said back mold half.

22. The apparatus as claimed in claim 21, wherein said means for imparting heat to the back mold half surface comprises means for the application of heated steam.

23. The apparatus as claimed in claim 21, wherein said means for imparting heat to the back mold half surface comprises a laser.

24. The apparatus as claimed in claim 18, wherein said restraining force means for maintaining said one mold half in fixed position comprises means for positioning finger members above the flange portion of said one mold half.

25. The apparatus as claimed in claim 16, wherein said heating means propagates heat across the surface of said other mold half so as to provide a temperature graduation over said mold half surface.

26. The apparatus as claimed in claim 16, wherein said heating means heats said other mold half to a temperature higher than the temperature of the contact lens contained in said mold assembly.

27. The apparatus as claimed in claim 24, wherein said flange portions of said mold halves are in parallel spaced superposition, said finger members for retaining said front mold half in fixed position and said pry fingers for separating said back mold half from said front mold half extending into the space between said flange portions.

28. The apparatus as claimed in claim 27, wherein means coats the surface of the flange portion of said front mold half with a surfactant so as to enable a ring of lens molding material formed between said flange portions to adhere to the flange portion of said back mold half upon said back mold half being separated from said front mold half.

29. The apparatus as claimed in claim 19, wherein at least two of said pry fingers engage the flange portion of said back mold half so as to cause said back mold half to rotate in unison with incremental rotational displacement imparted to said pry fingers.

30. The apparatus as claimed in claim 18, wherein said means for applying a vertical lifting movement and imparting a rotational force comprises rotatable cam members; and drive means for controllably actuating said cam members.

* * * * *